United States Patent [19]

Nishibe

[11] Patent Number: 5,113,215
[45] Date of Patent: May 12, 1992

[54] IMAGE POSITION DETECTING DEVICE

[75] Inventor: Takashi Nishibe, Kanagawa, Japan

[73] Assignee: Fuji Electric Co., Ltd., Kanagawa, Japan

[21] Appl. No.: 586,981

[22] Filed: Sep. 24, 1990

[30] Foreign Application Priority Data

Oct. 27, 1989 [JP] Japan .................................. 1-280747

[51] Int. Cl.$^5$ .............................................. G03B 13/36
[52] U.S. Cl. .................................... 354/408; 354/286; 354/481
[58] Field of Search ............... 354/402, 406, 407, 408, 354/286, 481

[56] References Cited

U.S. PATENT DOCUMENTS

| | | | |
|---|---|---|---|
| 4,636,624 | 1/1987 | Ishida et al. | 354/406 |
| 4,716,434 | 12/1987 | Taniguchi et al. | 354/408 |
| 4,816,861 | 3/1989 | Taniguchi et al. | 354/408 |
| 4,851,657 | 7/1989 | Taniguchi et al. | 354/408 |

Primary Examiner—Russell E. Adams
Attorney, Agent, or Firm—Finnegan, Henderson, Farabow, Garrett, and Dunner

[57] ABSTRACT

An image position detecting device for detecting relative positions of images of an object on a pair of image sensors. A pair of image data groups are derived from the pair of image sensors. The image position detecting device includes window-size designating means, correlative value calculating means, and highest-correlation detecting means. The window-size designating means determines the number of data to be contained in windows, which define partial data groups from the image data groups depending on an optical parameter of the optical instrument. The correlative value calculating means calculates a correlative value representing the correlation between a pair of partial data groups defined by the windows. The highest-correlation detecting means detects the combination of the partial data groups with a correlative value which represents the highest correlation, and changes the combination of the partial data groups by successively displacing the windows for both the image data groups. With such an arrangement, an index is obtained from the positions of the windows for the combination of the partial data groups with the highest correlation to indicate the relative positions of the images on the pair of image sensors.

15 Claims, 5 Drawing Sheets

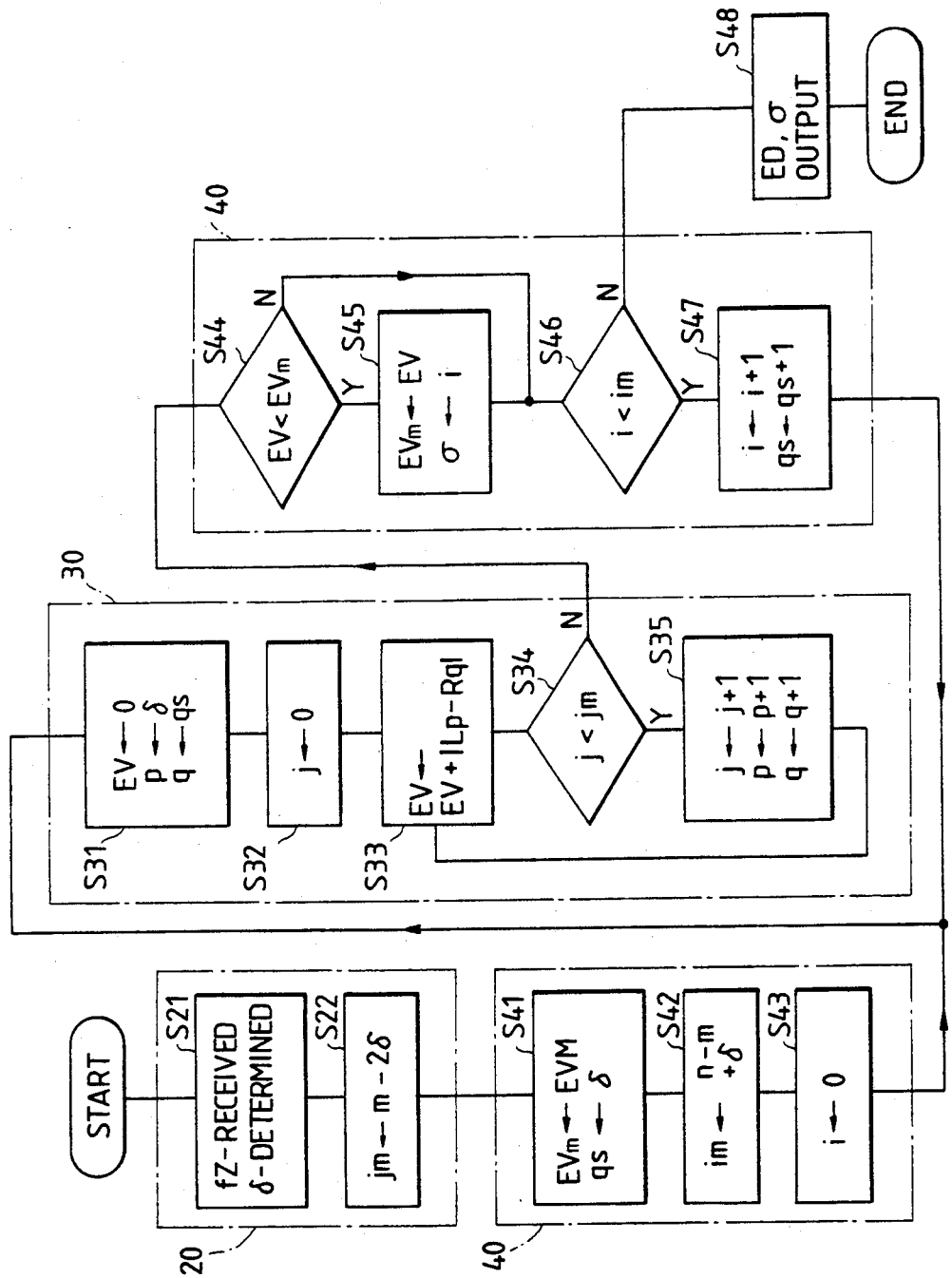

IMAGE POSITION DETECTING DEVICE

BACKGROUND OF THE INVENTION

1. Field of the Invention

The present invention relates to an image position detecting device suitable for use with an auto-focusing device in a camera. More particularly, the present invention relates to an image position detecting device which detects the relative positions of the image of an object on a pair of image sensors.

2. Description of the Related Art

Generally, conventional auto-focusing optical instrument have utilized one of two systems, either an active system for measuring the distance from the optical instrument to an object using infrared rays, or a passive system for measuring the distance by using light reflected from an object. To detect this distance, and the related distance from an in-focus position, the passive system generally projects an image of an object on a pair of image sensors, each sensor consisting of a number of photosensor elements. The passive system then electronically detects the relative positions of the image on the image sensors. A typical example of a conventional passive image position detecting device that utilizes these concepts will now be described.

FIG. 8 shows a conventional system for distance detection based on the image position. As shown, a pair of small lenses 2L and 2R (L indicating left and R indicating right) for projecting an image of an object 1 are displaced a distance "d" from the object. The lenses 2L and 2R are disposed at different positions separated by the length "b". Images 4L and 4R of the object 1 are focused at positions PL and PR on the image sensors 3L and 3R disposed near the lenses 2L and 2R. If the object 1 is located at an infinitely distant point, the image of the object 1 is focused on reference positions PO, where two parallel optical paths LO interest the image sensors 3L and 3R. Assuming that the displacement of the positions PL and PR from the reference points PO are xL and xR, respectively, the distance "d" from the optical instrument to the object 1 may be expressed as:

$$d = bf/(xL + xR).$$

In the above equation, "b" and "f" are known parameters determined by the optical instrument. Therefore, as seen from the equation, the distance "d" can be determined by using the relative positions of the images 4L and 4R on the image sensors 3L and 3R. More specifically, the distance "d" is a function of the sum of the displacements xL and xR of those images from the reference positions PO.

FIG. 9 shows a diagram explaining how the displacements xL and xR are summed. Groups of image data 5L and 5R, obtained by the pair of image sensors 3L and 3R, are illustrated in the upper portion of FIG. 9 Each group of image data consists of a set of pixels equal in number to the photosensors in each image sensor. Each pixel of image data is a digital value representing the intensity of light received by the photosensor.

As represented two dimensionally in FIG. 9, image data group 5L consists of (n+1) number of image data elements $L_o$ to $L_n$. Each image data element may contain one or more pixels. Similarly, the image data group 5R consists of (n+1) number of image data elements $R_o$ to $R_n$. The image data groups each contain the image patterns 4L and 4R shown in FIG. 8.

In order to detect the relative positions of images 4L and 4R, imaginary windows 6, hatched as shown in FIG. 8, are used. The partial data groups defined by the windows 6 are selected from the image data 5L and 5R shown in FIG. 9. The correlation between the paired partial data groups is checked. Specifically, it is determined whether the two partial data groups are coincident with each other. After the determination is made, the two partial data groups are changed and the correlation is checked again. Several possible combinations of the partial data groups are illustrated under the right and left image data groups 5R and 5L shown in FIG. 9.

The partial data group defined by each window 6 consists of (m+1) number of image data elements (where n>m). For the first combination C of the partial image data groups, the correlation between the two partial data groups is checked (the first group consisting of image data elements $R_n$ to $R_{n-m}$ from the left end of the right image data group 5R). As is readily seen, when the object is located at an infinitely distant point, the combination $C_o$ of the image data groups will exhibit the highest correlation.

For the combination $C_1$, the right partial data group is displaced by one element of image data. As shown in FIG. 9, the combination $C_1$ includes a right image data group from $R_{n-1}$ through $R_{n-m-1}$. Similarly, the left partial data group associated with combination $C_2$ is displaced one element of image data. The remainder of the combinations are alternately displaced in a similar fashion.

The combination of the left and right partial data groups is generally expressed by $C_i$, where "i"=0 to $2n-2m$. Further, assume that of those combinations, the k—the combination ("$C_k$") exhibits the highest correlation. As is readily seen, the value k of the combination $C_k$ may be used as an index which is proportional to the sum xL+xR of the displacements. Therefore, the constant of proportionality between the index value k and the sum xL+xR is equal to the linear density of the array of the photosensors which comprises the image sensor.

The operation of a conventional distance detecting device which uses the positions of the images on the image sensor was previously described. In the automatic focusing operation of a camera, for example, it is common practice that the index "i" is used directly, without calculating the distance "d". While only the principle of distance detection has been discussed, it should be understood that image position detection may be used for other purposes, such as a part of a focusing system in an optical instrument.

In a conventional distance detection operation, the size of the windows for detecting the relative positions of an object defines the width of the field of detection and the angle of the field of detection. Accordingly, accurate detection requires that neither the field angle be too wide nor too narrow. Therefore, the window size is empirically optimized to obtain the highest detection accuracy. However, when the optical parameters of a photographic lens, for example, are changed, the optimized condition may be lost, and the detection accuracy may be accordingly impaired.

In conventional cameras, interchangeable lenses and zoom lenses are frequently used. When such lenses are used, the field angle may be greatly changed. Frequently, the field angle is optimized for a standard lens or zoom. When another lens is used or the camera is used at a different zoom, the object is therefore frequently detected using an improper field angle. This phenomenon will now be described in detail with reference to FIGS. 6 and 7.

FIG. 6 shows a field angle for image position detection. A field angle "α" is given by $$\alpha = 2 \arctan (w/2f).$$

where "f" is the focal distance of the small lens 2, and "w" is the width of the window 6 used for detecting a position of an image 4, which is imaged on the image sensor 3 through the lens 2.

FIG. 7 shows a photographic angle "β" of a film photographing system. A photographic angle "β" is expressed by $$\beta = 2 \arctan (h/2fz),$$

where "fz" is the focal length of a photographic lens 7, and "h" is the width of a film 8 on which the image 4 and background are imaged through the lens 7.

Generally, the detection field angle α is set to be smaller than the photographic angel "β". A field ratio Q ($=\alpha/\beta$) indicates the portion of the photographic angle used for detecting the position of an image. For the standard lens, an optimum value, which may generally be equal to or less than "1", is empirically selected. When the standard lens is replaced by a wide angle lens, however, the photographic angle "β" becomes large, and hence the field ratio Q becomes excessively small. When the standard lens is replaced by a telephoto lens, the photographic angle becomes small and the field ratio becomes excessively large. In both cases, the image position detection accuracy is degraded.

SUMMARY OF THE INVENTION

To overcome these problems, the present invention provides an image position detecting device which controls the field ratio to an optimum level so that the position of an object is continuously detected at a proper field angle even when the optical parameters of an optical instrument are changed, for example, due to the replacement of the photographic lens of a camera, the change of the zoom of the photographic lens, and the like.

Another object of the present invention is to control the field ratio by electrical means, rather than optical means, while keeping the electrical arrangement as simple as possible.

To achieve the above objects, the present invention provides an image position detecting device for detecting relative positions of images on a pair of image sensors from a pair of image data groups, comprising: window-size determining means for determining the number of data to be contained in windows for picking up partial data groups from the respective image data groups, depending on an optical parameter of the optical instrument; correlative value calculating means for calculating a correlative value representing a correction between a pair of partial data groups as picked up by both the image data groups by the designated windows; and correlation detecting means for detecting the combination of the partial data groups whose correlative value represents a selected correlation, while changing the combination of the partial data groups whose correlative value is to be calculated by successively displacing the windows for both the image data groups, whereby an index for indicating the relative positions of the images on the pair of image sensors is obtained from the positions of a pair of windows for the combination of the partial data groups whose correlation is the highest.

The window-size designating means, correlative value calculating means, and the correlation detecting means may be constructed with electronic circuitry as will be described later. For example, electronic circuitry integrated into a semiconductor chip or a microcomputer and appropriate software may be used.

The window size to be designated in accordance with an optical parameter of an optical instrument may be functionally expressed. Usually, the window size is selected empirically. It is preferable to use a table stored in a memory, such as a ROM, to access the window size function.

For example, if the optical parameter is the focal length of the lens of a camera, the window-size designating means selects the window size to define partial data groups in accordance with the focal length to optimize the field ratio. When the photographic angle becomes small, the window size is reduced, and when the photographic angle becomes large, the window size is increased.

The correlative value calculating means evaluates the correlation between the image data contained in the combined partial data groups, and calculates a corresponding correlative value.

The correlation detecting means detects the combination exhibiting the highest correlation, while successively changing the combination of the partial data groups evaluated by the correlative value calculating means.

After the combination with the highest correlation is selected by the correlation detecting means, an index (e.g., the combination number "k") corresponding to the position of a pair of windows associated with that combination is obtained. In this way, an index indicating the relative positions of the images on the image sensors can be obtained.

Other objects, features, and advantages of the present invention will be apparent from reading the following description in connection with the accompanying drawings.

BRIEF DESCRIPTION OF THE DRAWINGS

FIG. 5 is a flowchart showing a control routine executed by the microcomputer shown in FIG. 4.

DETAILED DESCRIPTION OF THE PREFERRED EMBODIMENTS

Preferred embodiments of an image position detecting device according to the preset invention will now be described with reference to the accompanying drawings.

Figure 1:
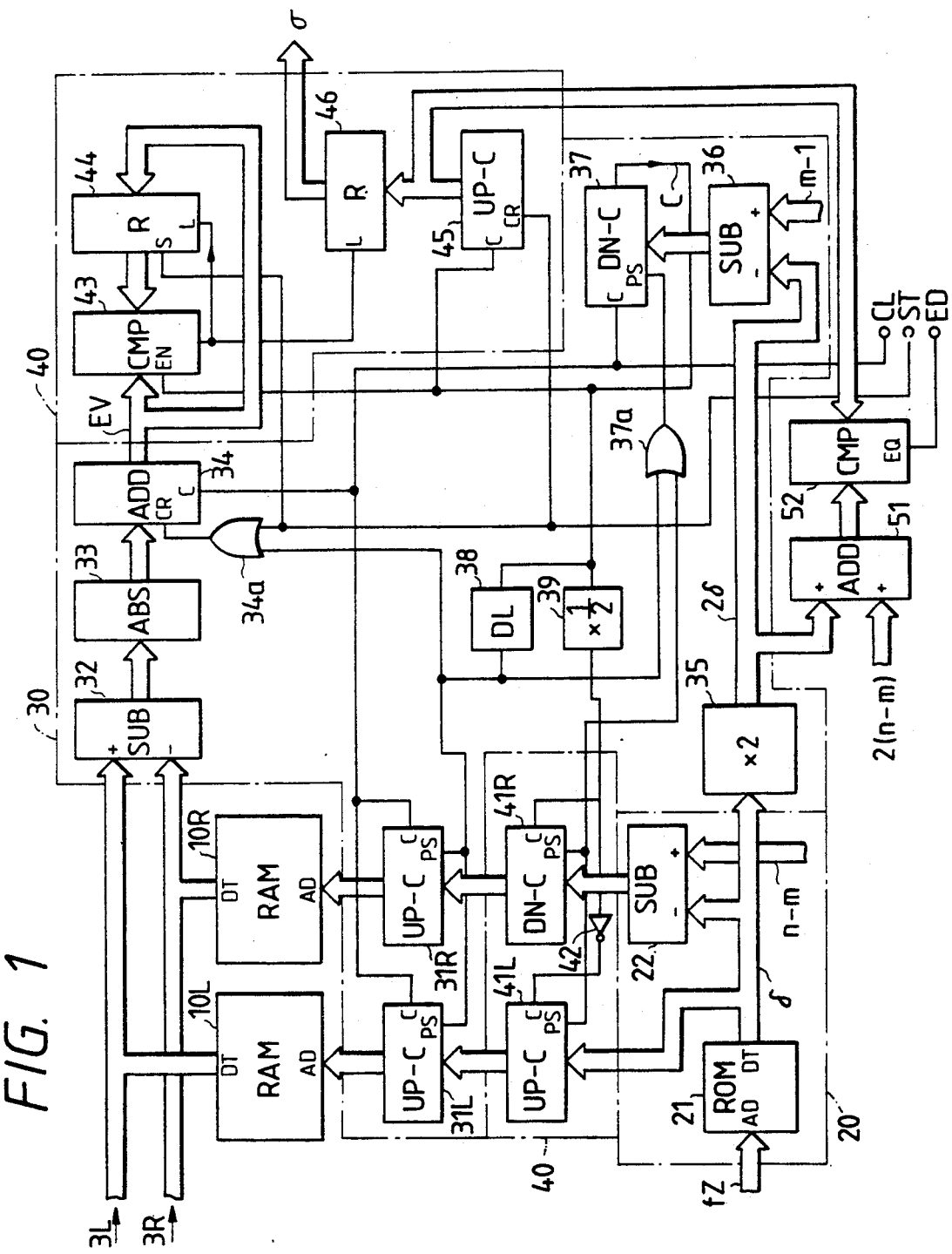
FIG. 1 shows a block diagram of an image position detecting device according to the present invention.
Figure 2:
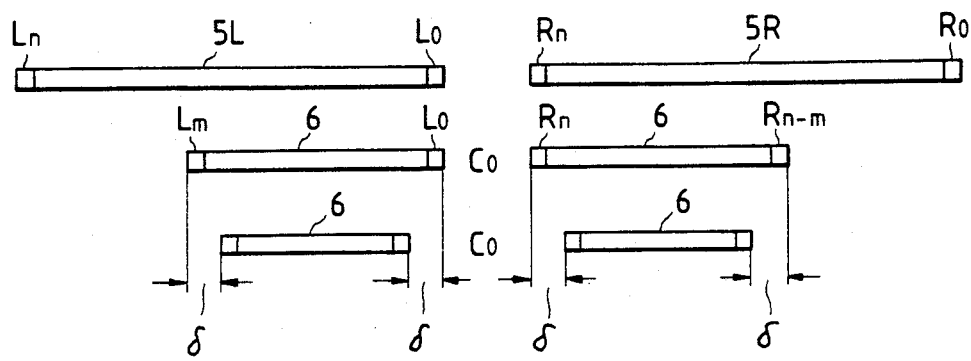
FIG. 2 shows a model of image data groups and an array of partial data groups and explains the relationship between partial data groups, the image data groups, and windows.
Figure 3:
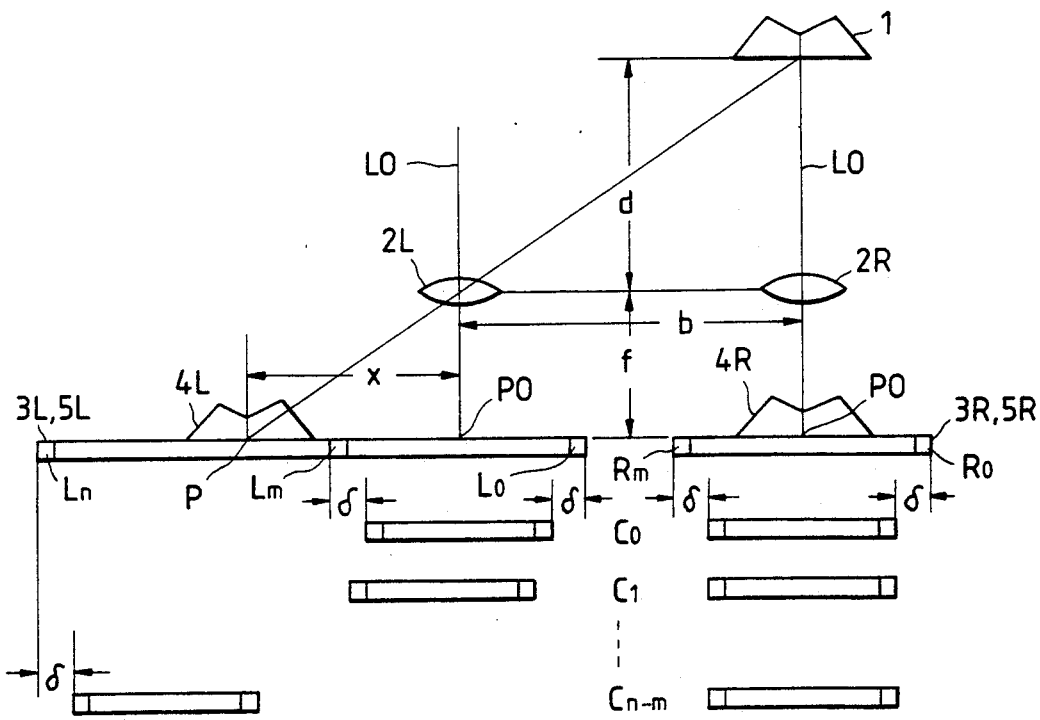
FIG. 3 shows the optical part of an image position detector according to a second embodiment and the relationship between partial data groups, image data groups, and windows.
Figure 4:
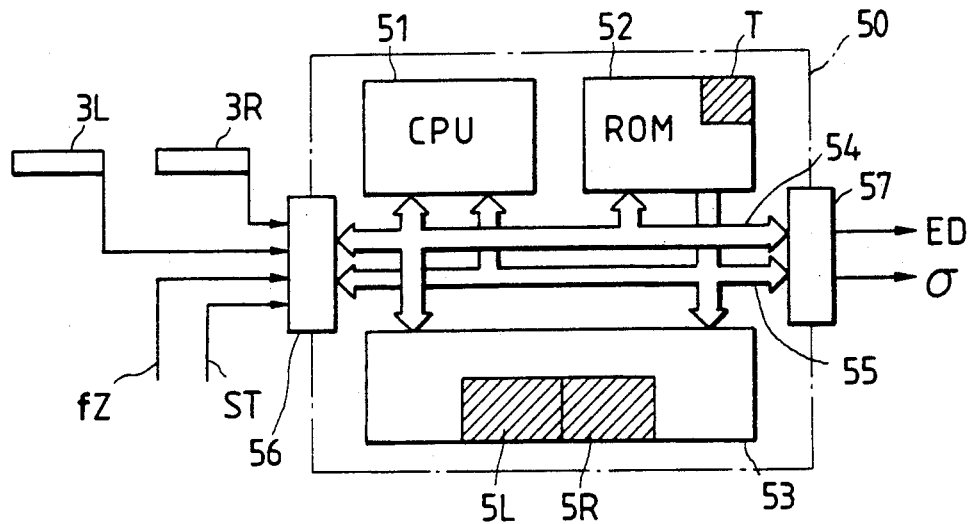
FIG. 4 is a block diagram showing a microcomputer used in the second embodiment.
Figure 6:
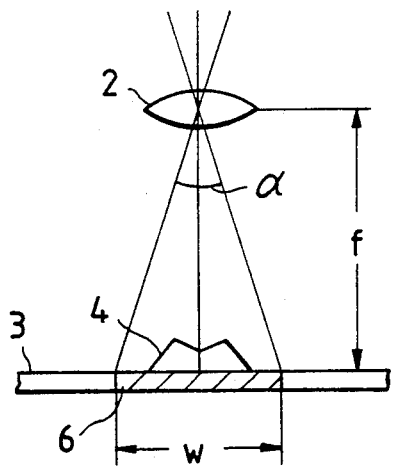
FIGS. 6 and 7 are diagrams explaining the field angle and a photographic angle.
Figure 8:
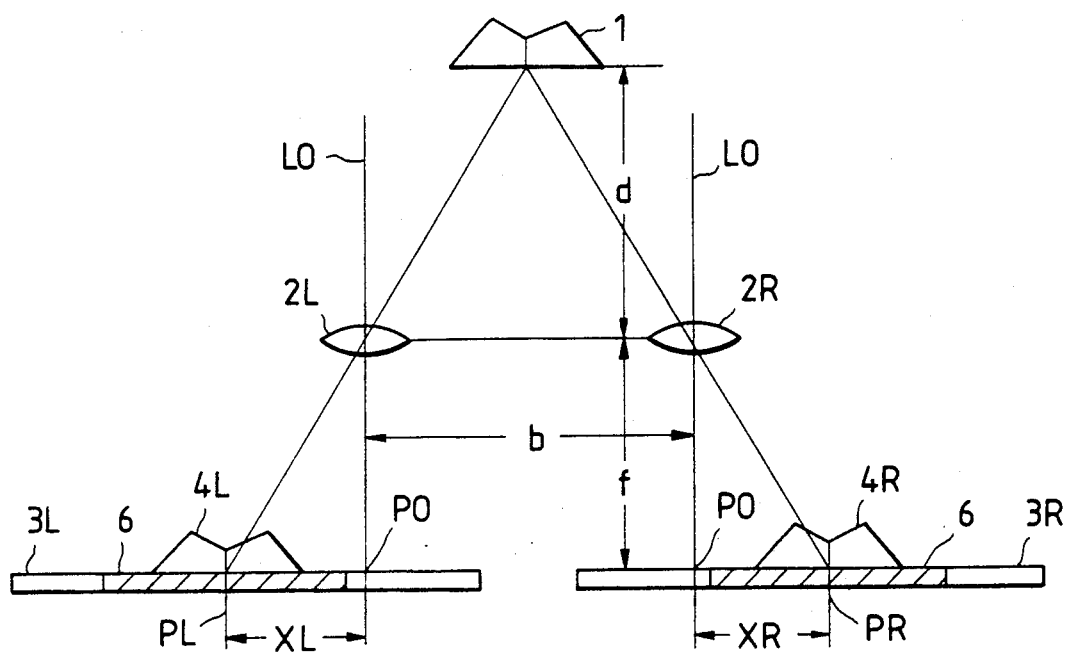
FIG. 8 is a diagram of the optical part of a conventional image position detecting device.

FIGS. 1 and 2 show a first embodiment of an image position detecting device according to the present invention constructed with electronic circuitry. FIGS. 3 to 5 show a second embodiment of an image position detecting device according to the present invention constructed using a microcomputer and software. In these embodiments, for example, the image position detecting device is used to detect distance, as discussed with reference to FIGS. 8 and 9.

In the circuit arrangement of the first embodiment shown in FIG. 1, RAMs 10L and 10R, as illustrated in the left upper corner, store a pair of image data groups 5L and 5R, as illustrated in the right and left top lines in FIG. 2. The image data groups 5L and 5R are generated by the image sensors 3L and 3R shown in FIG. 8, respectively. The left image data group 5L consists of (n+1) number of image data elements, denoted as $L_o$ to $L_n$. The right image data group 5R also consists of (n+1) number of image data elements, denoted as $R_o$ to $R_n$. A window-size designating means 20, as illustrated in the lower left corner in the figure, contains a ROM 21 in this embodiment. The ROM 21 stores a table which expresses the window size as a function of an optical parameter of the optical instrument.

Figure 7:
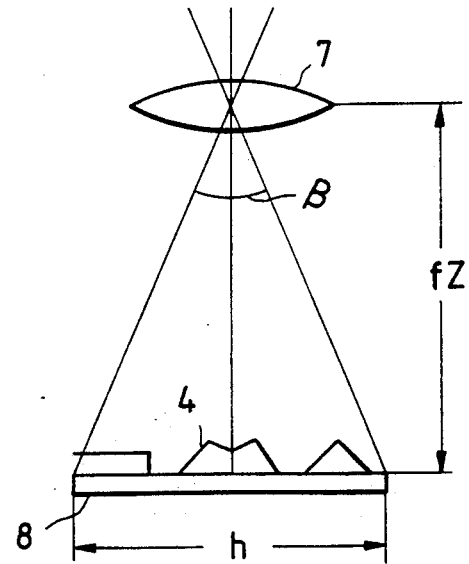

The focal distance "fz" of the photographic lens 7 shown in FIG. 7 is used as the optical parameter in this embodiment. In the case of an interchangeable lens, the optical parameter is received from a lens ROM (not shown), for example, as its accessory. In the case of a zoom lens, the optical parameter may be received from an encoder (not shown) in the zooming mechanism. The received parameter is applied as an address signal to the address input terminal AD of the ROM 21 shown in FIG. 1.

In this instance, the window size, which corresponds to the parameter, is shown as a control quantity $\delta$ (delta) for a window size in FIG. 2. In the second line in FIG. 2, there are illustrated right and left partial data groups $R_n$ to $R_{n-m}$ and $L_o$ to $L_m$ for the first data combination $C_o$ from image data groups 5R and 5L corresponding to the largest size window.

In the present embodiment, $\delta$ number of image data elements are then subtracted from both sides of each partial data group, as illustrated in the third line in FIG. 2. A range of the control quantity $\delta$ is stored in the ROM 21 in a function table associated with a corresponding range of focal distances "fz". The appropriate $\delta$ quantity corresponding to the value of the focal distance "fz" received by the ROM 21 is output from the data output terminal DT of the ROM 21.

Figure 9:
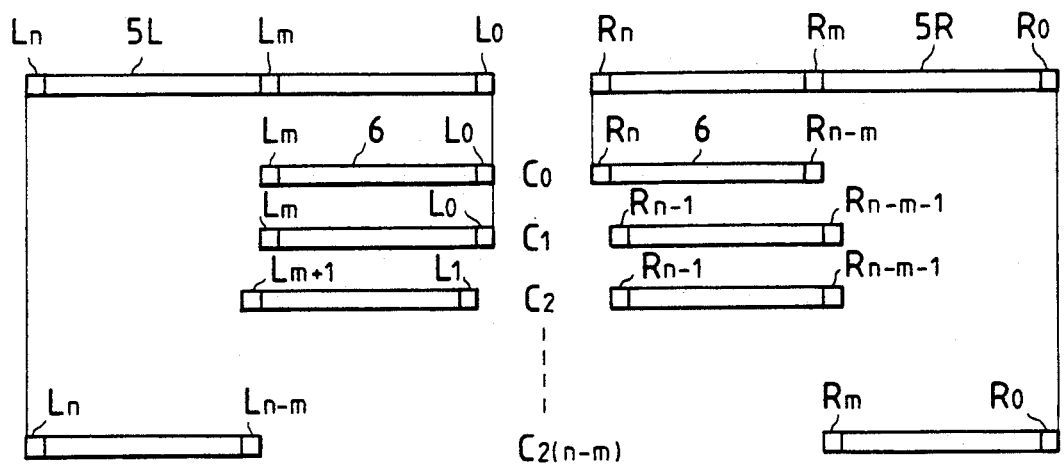
FIG. 9 shows image data groups and an array of partial data groups which explain the selection of partial data groups from the image data groups through windows in a conventional distance detecting device.

In this embodiment, the method as previously mentioned in connection with FIG. 9 may be used to obtain two partial data groups from the two image data groups 5L and 5R. That is, the windows for the second and subsequent combinations of partial data groups are alternately displaced in successive order from the previous combination of partial data groups, beginning with the first combination $C_o$. The set of combinations of the partial data groups may be expressed by "$C_i$," where "i" = 0 to 2 $(n-m+\delta)$.

A pair of counters 41L and 41R in a correlation detection means 40, as illustrated above the ROM 21, are used to select the combination $C_i$. Counter 41L is an up-counter and directly receives the control quantity $\delta$ from the ROM 21. Counter 41R is a down-counter and receives the result of the subtraction $(n-m-\delta)$ from a subtractor 22, which calculates a difference between $(n-m)$ and the quantity $\delta$. The up-counter 41L is preset to the number of the rightmost image data element of the left partial image data group in the first combination $C_o$ (see FIG. 2). The up-counter 41R is preset at the number of the rightmost image data element of the right partial image data group in the first combination $C_o$.

A pair of up-counters 31L and 31R in the correlative value calculating means 30, which are illustrated above the paired counters 41L and 41R, are preset to the same values which counters 41L and 41R are preset, respectively. In response to a clock pulse signal CL, counters 31L and 31R sequentially count up, thereby to form address signals which are applied to the address input terminals of the RAMs 10L and 10R. RAMs 10L and 10R are accessed for data read-out upon application of the address signals.

When addressed, the RAMs output the image data elements of the partial data groups in synchronism with the clock pulse signal CL. The image data output from the RAMs is applied to subtractor 32 in the correlative value calculating means 30. Then, the output of the subtractor 32 is applied to an absolute value circuit 33 in which the absolute value of the subtraction result is obtained. In the adder 34, the absolute values are successively added in synchronism with the clock pulse signal CL. Subtractor circuit 32, absolute value circuit 33, and adder circuit 34 cooperate to calculate a correlative value EV.

As seen from the above description, in the present embodiment, when all the pixels of the image data of the right partial data group are perfectly coincident with those of the left partial data group, the correlative value EV is "0", which represents the highest correlation. It should be understood that any other suitable correlation evaluation function may be used to evaluate the correlation between the partial data groups.

The correlative value detecting means 30 further includes a doubling circuit 35 for setting the number of additions by the adder 34, a subtractor 36, and down-counter 37. The doubling circuit 35 receives the control quantity $\delta$, doubles it, and produces a signal representative of $2\delta$. The subtractor 36 takes the difference between $(m-1)$ and $2\delta$, (i.e., $(m-2\delta-1)$), and supplies it to the down-counter 37. When the down-counter 37 receives a number of clock pulses CL equal to the number of image data elements in the partial data group $(m-2\delta)$, it produces a carry signal C and applies it to an enable input terminal En of correlation comparator 43 in the correlation detecting means 40. At the same time, the adder 34 completes the calculation of the correlative value EV of the current combination $C_i$ of partial data groups.

The correlation comparator 43 compares the content of a register 44 with the correlative value EV calculated by the adder 34. Upon receipt of the carry signal C and if the value stored in the register 44 is smaller than the current correlative value EV, the comparator produces a latch command to enter the current correlative value EV in the register 44.

Thus, the register 44 stores the correlative value representing the highest correlation. Following the above carry operation, the register stores the smallest value of the correlative values thus far calculated.

A delay circuit 38 provided in the correlative value calculating means 30 receives the carry C, and after a small delay, applies its output signal through an OR gate 34a to the adder 34, which clears the adder for the next correlative value calculation. A halving circuit 39, which also receives the carry C, switches the logic state of its output from "H" to "L", or vice-versa each time it receives the carry C to switch the current windows. The down-counter 41R in the correlation detecting means 40 receives an output signal of the halving circuit 39, and increments downward each time the carry C is produced. The up-counter 41L receives the output signal of inverter 42, which also receives the output signal of the halving circuit 39, and increments upward each time the carry C is produced. By these counting operations, the counters alternately increase or decrease by one the data number of the first image data element of the partial data groups. In this way, the switching of the windows is performed.

The up-counters 31L and 31R of the correlative value calculating means 30 receive the output signal of the delay circuit 38 at the preset input terminals PS, and are initially set to the count values of the up-counter 41L and the down-counter 41R, which are alternately updated every time the carry C is produced. The output signal of the delay circuit 38 is also applied through an OR gate 37a to the down-counter 37. The output data signal of the subtractor 36 resets the down-counter 37 every time the carry C is produced.

In this way, a combination $C_i$ of the partial data groups is selected by a window (where size is designated by a window-size designating means 20) which is successively displaced from the pair of image data groups in the RAMs 10L and 10R by the correlation detecting means 40. For each combination $C_i$, the correlative values between the partial data groups are successively calculated by the correlative value calculating means 30. Of those correlative values calculated, the value representing the highest correlation is stored in the register 44 of the correlation detecting means 40. An up-counter 45 and a register 46 are provided in the correlation detecting means 40 to store the combination number "i" of combination $C_i$ having the highest correlation.

The up-counter 45 keeps track of the combination number and is cleared by a start pulse ST, which is used to start the image position detecting device according to the present invention. After being cleared, up-counter 45 receives the carry C which terminates the calculation of the correlative value EV of the combination $C_i$. Upon receipt of the carry C, up-counter 45 increments by one, thereby to record the combination number "i". When the current correlative value EV indicates the highest correlation, the register 46 receives an output signal of the correlation comparator 43 at the latch input terminal L, as described above, and stores the current value in the up-counter 45 (i.e., the combination number $\sigma$ of the combination whose correlation is the highest).

The start pulse ST clears the up-counter 45 as mentioned above, and further clears the adder 34 in the correlative value calculating means 30 through the OR gate 34a, resets the down-counter 37 through the OR gate 37a, resets the up-counter 41L and the down-counter 41R in the correlation detecting means 40, and sets the register 44 at its maximum storage value. Thus, the start pulse ST initializes the operations of the above-listed components.

Additionally, an adder 51 and a combination comparator 52, which are in the final processing stages of the image position detecting device, are shown in FIG. 1. The adder circuit 51 sums the constant 2(n−m) and the output data signal 2δ from the doubling circuit 35 to produce the final combination number. The combination comparator 52 compares the final combination number with the combination number "i" in the up-counter 45. When these numbers are equal, the comparator produces an end signal ED.

The optical instrument in accordance with the present invention reads out of the register 46 the combination number "k" as the output index $\sigma$ (sigma) of the combination with the highest correlation in response to the end signal ED. This combination number "k" may be used as an index indicating the relative positions of the images on the pair of image sensors.

The image position detecting device of the present embodiment, together with a pair of image sensors, for example, may be fabricated into a single, small semiconductor chip. In operation, the semiconductor chip sends the start pulse SP and the clock pulse CL to the image position detecting device, thereby causing the device to begin operation. To stop the device, the optical instrument responds to the end signal ED by stopping the clock pulse CL, and outputs the index $\sigma$ as the position detection results.

An image position detecting device according to a second embodiment of the present invention, which is shown in FIGS. 3 to 5, will now be described. The second embodiment includes a microcomputer with associated software for implementing the various concepts of the present invention. Further, the second embodiment relates to the structural arrangement of the pair of image sensors.

In the present embodiment, distance detection is accomplished by directing the optical instrument toward an object by means of a finder. Accordingly, as shown in FIG. 3, a lens 2R ("R" designating the right side) and a lens 2L ("L" designating the left side) receive light from an object 1. When the object is at an infinitely distant position, images 4R and 4L are imaged by lens 2R and lens 2L at reference positions PO. In this embodiment, the image sensor 3R on the right side may consist of smaller number of photosensors than a corresponding image sensor as described in the first embodiment.

Furthermore, an image 4L is formed by the left lens 2L at position P. Position P changes depending on a distance from the optical instrument to the object 1. Accordingly, due to the numerous potential locations of image 4L, the image sensor 3L on the left side should contain a large number of photosensors. Preferably, image sensor 3L should contain a number of photosensors substantially equal to that i the first embodiment. Assuming the position P of the left image 4L is displaced from the reference position PO by distance "x," the distance "d" to the object 1 may be expressed by the following equation $d = bf/x.$ The above equation shows that the distance "d" can be obtained by detecting the displacement "x". As in FIG.

8, "b" is the base line between the two lenses, and "f" is the focal distance of each small lens.

FIG. 3 shows data groups 5L and 5R superimposed over the image sensors 3L and 3R, respectively. The left image data group 5L consists of $(n+1)$ image data elements $L_o$ to $L_n$. The right image data group 5R consists of $(m+1)$ image data elements $R_o$ to $R_m$. Similarly in this embodiment, the partial data groups are formed as shown form the combination $C_i$ ($i=0$ to $2(n-m)$) to detect the position of the image 4L. In this embodiment, the window for selecting the partial data group on the right side remains fixed, while the windows of selecting the partial data group on the left side are displaced in successive order. The size of the largest window on the left side is selected to be equal to the window size of the right image data group 5R (i.e., $(m+1)$ image data elements). In this embodiment, the window size is controlled by removing a $\delta$ number of image data elements from both sides of the previous window, as in the first embodiment.

FIG. 4 shows the general arrangement of a microcomputer 50 used in the present embodiment. As shown, a CPU 51, ROM 52, and RAM 53 are connected through an address bus 54 and a data bus 55. An input port 56 and an output port 57 are provided. The ROM 52 stores functional relationships between the optical parameter fz and the control quantity $\delta$ in the form of a table T. The image data 5L and 5R derived from the image sensors 3L and 3R is received through the input port 56 to be stored in the RAM 53. The optical constant fz and the start command ST as delivered from the optical instrument are also received through the input port 56. The end signal ED and the index $\delta$ of the detection result are output through the output port 57 to the optical instrument. The software used in the preset embodiment may be loaded into the ROM 52 or RAM 53.

FIG. 5 shows a sequence of operations of the present embodiment as a flowchart. In FIG. 5, the operation steps performed by the window-size designating means are indicated by box 20, the correlative value calculating means by box 30, and the correlation detecting means by box 40.

The sequence shown in FIG. 5 begins in response to a start pulse ST from the optical instrument. In steps S21 through S43, various initial values are determined to allow subsequent processing. In the first step S21 by the window-size designating means 20, an optical parameter fz is received and a control quantity $\delta$ from the table T in the ROM 52 is determined. The next step S22 determines the window size corresponding to the control quantity $\delta$. The window size of $(m-2\delta+1)$ image data elements is designated. Also, the value $(m-2\delta)$ is set to a maximum value "jmax" of a variable "j".

In step S41, an initial value EVM is entered as a correlative value EVm. EVm represents a value associated with the highest correlation. In the second embodiment, the minimum value of the correlative value EVm represents the highest correlation. In this case, the minimum correlative value EVm must be initialized to be sufficiently larger than any anticipated value.

Further, the start number "qstart" of image data number "q" of the image data in the left partial data group (i.e., the data number of the image data at the right end of the partial data group as viewed in the drawing) is initialized to the control quantity $\delta$.

In the next step S42, the maximum value "imax" of the index "i" of the combination $C_i$ is initialized to be $(n-m+\delta)$. In step S43, the combination number "i" is initialized to "0"). The initialization of the correlation detecting means 40 is now complete.

Next, the correlative value calculating means 30 begins operation. In step S31, the correlative value EV is set to "0." Then, the data number "q," which designates a specific image data element of the image data in the right partial data group shown in FIG. 3, is set to the control quantity $\delta$, and the data number "q," which designates a specific image data element of the image data in the left partial data group, is set to the start number "qstart." In the next step S32, the data number "j" which designates a specific image data element of the image data within the window is set to "0".

Step S3 is the correlative value EV calculation step in the operation of the correlative value calculating means 30. Also, the second embodiment has a similar correlation evaluation function as that of the first embodiment. The absolute value of the difference between the p-the image data element $L_p$ in the left partial data group and the q-the image data element $R_q$ in the right partial data group is successively added to the previous correlative value EV.

Step S34 determines whether the end of the correlative value EV calculation has been reached. If the image data number variable "j" is smaller than its maximum value, the procedure goes to the next step S35 which increments the variables "j," "p," and "q" by one, and returns to step S33. The variable "j" reaches its maximum value "jmax" when the calculation of the correlative value EV (the correlation between the right and left partial data groups of the combination $C_i$) is complete. When this calculation is complete, the procedure jumps from step S34 to step S44.

In step S44, if correlative value EV calculated by means 30 is less than the minimum correlative value EVm. The procedure advances to step S45 where the value EVm is replaced by a new correlative value EV, and a detection result value $\sigma$ is set to the current number "i" of the current combination. If the answer is NO, the procedure goes to step S46.

The next step S46 checks if the correlation evaluation has been completed for all of the combinations. This is done by comparing the current variable "i" with its maximum value "imax." If "i" is less than "imax", then in step S47 the variable "i" is incremented by one, and "1" is added to the initial value "qstart" of the variable "q," which thereby shifts the window of the left partial data group to the left by one image data element, and the procedure returns to step S31.

When the correlation evaluation for all of the combinations is complete, and the current variable "i" equals the maximum value "imax," the procedure goes from step S46 to step S48. The combination number "k" of the combination $C_i$ exhibiting the highest correlation of all combinations evaluated is stored as the index o. In step S48, an end signal Ed and the index o are output. At this point, the operation of the image position detecting device is complete. Following, the optical instrument may enter an auto-focusing phase of operation. In most of the optical instruments, a microprocessor may be used to execute this operation.

In the first and second embodiments, the number of the photosensors of each image sensor is preferably 48 to 128. The number of image data elements within the largest window is preferably about one half of the above number. Furthermore, the number of photosensors in the shorter image sensor is preferably equal to the number of elements in the largest window. These figures are preferable for improving the detection accuracy.

While the present invention has been described in reference to two embodiments of the image position detecting device, which include a microcomputer and associated software, the invention may be implemented by other various techniques and devices. Further, it should be understood that the electronic circuitry of FIG. 1 and the sequence of operations steps shown in FIG. 5 are explained by way of example and should not be viewed as limiting the present invention.

Although the first and second embodiments of the present invention specifically perform distance detection function, the present invention is suitable for various general uses of any optical instrument including a pair of image sensors wherein the relative positions of the images of an object are detected by the image sensors.

As seen from the foregoing description of the present invention, an image of an optical instrument receives an image of an object by a pair of image sensors. The relative positions of the images on the pair of image sensors are determined from a pair of image data groups, which are output from the image sensors. If an optical parameter of the optical instrument is changed, the detection accuracy will be inevitably impaired in a conventional device. The present invention advantageously determines the size of the windows (which select partial data groups from the image data groups) with the window-size designating means in accordance with the optical parameter of the optical instrument. The properly sized windows select partial data groups from the image data groups, and then a correlative value between partial data groups is calculated. The correlation detecting means successively shifts the positions of the windows, and detects the combination of the partial data groups which exhibits the highest correlation. Accordingly, if the optical parameter of an optical instrument and associated photographic angle ($\beta$) changes, a field ratio Q and the detection field angle $\alpha$ are always optimized, which maintains a high detection accuracy for the image position detecting device.

The preferred application of the present invention is an auto-focusing camera which includes an interchangeable lens and/or a zoom lens in which the optical parameters may be greatly changed. The present invention successfully solves a very difficult technical problem and improves the focusing accuracy and performance of high grade optical instruments.

The image position detecting device of the present invention may be constructed with electronic circuitry. In this case, the circuitry and the image sensors as well may be fabricated into a single semiconductor chip. Alternatively, the present invention may be implemented with software and may be driven by a microcomputer included in the optical instrument. In either case, a highly accurate and economical image position detecting device may be realized.

What is claimed is:

1. An image position detecting device for use in conjunction with an optical instrument having a field angle corresponding to the width of optical detection, the image position detecting device detecting the relative positions of a first and a second similar images projected onto a first and a second image sensors, respectively, each image sensor producing an electrical signal representing an image data group, comprising:

window size determining means for determining the size of a window in response to the field angle of the optical instrument, said window defining a partial image data group from the image data group;

correlative value calculation means for calculating a correlative value for a combination of partial image data groups, said combination of partial image data groups including a first partial image data group defined by said window from the image data group of the first image sensor and a second partial image data group defined by said window from the image data group of the second image sensor; and correlation detecting means for selecting a plurality of said combinations and for detecting the combination from said plurality with a selected correlation and for providing an output signal indicating the relative positions of the first and second images on the first and second image sensors.

2. The image position detecting device of claim 1, wherein said window size determining means comprises a ROM for providing a delta value in response to a focal length value.

3. The image position detecting device of claim 2, wherein said window size determining means further comprises a subtractor for subtracting said delta value from a largest window size value to output the desired window size value.

4. The image position detecting device of claim 1, wherein said correlative value calculation means comprises a subtractor for subtracting an image data element of said second partial data group to produce an output signal.

5. The image position detecting device of claim 4, wherein said correlative value calculation means comprises an absolute value circuit connected to said subtractor which produces a signal corresponding to the absolute value of the output signal from said subtractor.

6. The image position detecting device of claim 1, wherein said correlative value calculation means comprises an adder connected to said absolute value circuit for producing a signal corresponding to the correlation of a combination of partial data groups.

7. The image position detecting device of claim 6, wherein said correlative value calculation means comprises a counting means for counting the number of image data elements included in each partial image data group.

8. The image position detecting device of claim 1, wherein said correlation detecting means comprises a correlative value register for storing a correlative value and a correlation comparator for comparing a current correlative value from said correlative value calculation means with said correlative value stored in said register.

9. The image position detecting device of claim 8, wherein said correlation detecting means further comprises a counting means for producing an index value corresponding to the number of comparisons said correlation comparator has performed and an index register for storing the index value associated with the correlative value stored in said correlative value register.

10. The image position detecting device of claim 1, further comprising a memory means for storing the image data group produced by each image sensor.

11. The image position detecting device of claim 10, wherein said memory means comprises a first RAM for storing the left image data group and a second RAM for storing the right image data group.

12. The image position detecting device of claim 1, further comprising a combination adder for computing the total number of combinations of partial data groups and a combination comparator for comparing said total number of combinations of and an index value corresponding to the number of comparisons said correlation comparator has.

13. A method for image position detection for use in conjunction with an optical instrument having a field angle corresponding to the width of optical detection, the method detecting the relative positions of a first and a second similar images projected onto a first and a second image sensors, respectively, each image sensor producing an electrical signal representing an image data group, comprising the steps of:

determining the size of a window in response to the field angle of the optical instrument, said window defining a partial image data group from each image data group;

calculating a correlative value for a plurality of combinations of partial image data groups, each combination of partial image data groups including a first partial image data group defined by said window from the image data group of the first image sensor and a second partial image data group defined by said window from the image data group of the second image sensor;

detecting a combination with a selected correlation from said plurality of combinations; and producing an output signal corresponding to said combination with the selected correlation indicating the relative positions of the first and second images on the first and second image sensors.

14. The method of claim 13, wherein said calculating step comprises the substeps of:

Calculating a first intermediate correlative value corresponding to the correlation between a first image data element of said first partial data group and a first image data element of said second partial data group;

Adding said first intermediate correlative value and an intermediate correlative value sum to produce said correlative value.

15. The method of claim 13, wherein said detecting step compares a current correlative value with a previously determined correlative value to select a combination with the highest correlation from said plurality of combinations.

* * * * *

UNITED STATES PATENT AND TRADEMARK OFFICE
CERTIFICATE OF CORRECTION

PATENT NO. : 5,113,215
DATED : May 12, 1992
INVENTOR(S) : Takashi Nishibe

It is certified that error appears in the above-identified patent and that said Letters Patent is hereby corrected as shown below:

Claim 12, column 13, line 7, after "has" insert
--performed, said combination comparator producing
an end signal upon a favorable comparison--.

Signed and Sealed this

Twenty-eighth Day of September, 1993

*Attest:*

BRUCE LEHMAN

*Attesting Officer*   *Commissioner of Patents and Trademarks*